(12) United States Patent
Imai et al.

(10) Patent No.: US 6,782,761 B2
(45) Date of Patent: Aug. 31, 2004

(54) ULTRASONIC FLOW METER

(75) Inventors: Hiroshi Imai, Gyoda (JP); Masahiro Hasunuma, Gyoda (JP)

(73) Assignee: Surpass Industry Co., Ltd., Gyoda (JP)

( * ) Notice: Subject to any disclaimer, the term of this patent is extended or adjusted under 35 U.S.C. 154(b) by 32 days.

(21) Appl. No.: 10/061,915

(22) Filed: Feb. 1, 2002

(65) Prior Publication Data

US 2002/0104386 A1 Aug. 8, 2002

(30) Foreign Application Priority Data

Feb. 5, 2001 (JP) .......................... 2001-028291
Jan. 15, 2002 (JP) .......................... 2002-006689

(51) Int. Cl.[7] .............................................. G01F 1/66
(52) U.S. Cl. ................................................ 73/861.27
(58) Field of Search .......................... 73/861.27, 861.28, 73/861.29; 24/16, 22; 285/21.1, 21.2, 93, 369; 248/74.1, 74.4, 227.4

(56) References Cited

U.S. PATENT DOCUMENTS 4,425,804 A * 1/1984 Mount et al. ............. 73/861.28
4,454,767 A * 6/1984 Shinkai et al. ............ 73/861.18
6,173,926 B1 * 1/2001 Elvegaard ................. 248/74.1

* cited by examiner

Primary Examiner—Edward Lefkowitz
Assistant Examiner—Corey D. Mack
(74) Attorney, Agent, or Firm—Kolisch Hartwell, P.C.

(57) ABSTRACT

This ultrasonic flow meter is provided for measuring flow volume by determining the flow rate of a liquid from the difference in propagation times of ultrasonic waves in both directions between measuring units by providing measuring units having transducer at an interval in the lengthwise direction on a measuring pipe through which liquid flows. A pair of mounting members are provided in a lower case of a case serving as a base at an interval wider than that of measuring units. The measuring pipe is held by respective retaining indentations to the outside in the axial direction of measuring units by facing a left mounting member and a right mounting member that compose the mounting members. In addition, an insulating material is filled into the case so as to cover the measuring units and the measuring pipe.

23 Claims, 9 Drawing Sheets

ULTRASONIC FLOW METER

BACKGROUND OF THE INVENTION

1. Field of the Invention

The present invention relates to an ultrasonic flow meter that measures the flow volume of a liquid flowing through a pipe using ultrasonic waves.

2. Description of the Related Art

An ultrasonic flow meter is known in the prior art that uses ultrasonic waves to function as a flow meter that measures the flow volume of a liquid flowing through a pipe.

This ultrasonic flow meter provides two measuring units having a transducer at an interval in the lengthwise direction on a measuring pipe through which liquid flows. Ultrasonic waves are emitted from one of the transducers which are then received by the other transducer. Alternatively, ultrasonic waves are emitted from the other transducer and then received by the first transducer. The flow rate of the liquid in the measuring pipe is determined from the difference in propagation times of these ultrasonic waves, and flow volume is then measured from this flow rate.

However, if this ultrasonic flow meter is subjected to vibrations from the outside between the respective measuring units, measurement error occurring resulting in fluctuations in characteristics of the measurement data and causing problems that the flow volume cannot be measured accurately.

In addition, since the acoustic velocity, namely the velocity of the ultrasonic waves, changes according to the temperature of the liquid, it is necessary to measure flow volume using a conversion value corresponding to the temperature of the liquid. However, if ultrasonic waves emitted from the transducer are influenced by factors other than the temperature of the liquid, such as the outside ambient temperature, although the flow volume was corrected by converting according to the temperature of the liquid, there is the problem that the acoustic velocity is changed due to slight changes in temperature and the flow volume cannot be measured accurately.

The following provides a detailed explanation of changes in the acoustic velocity caused by changes in the temperature of the liquid using the drawings.

FIG. 9 is a graph showing the relationship between the temperature (° C.) of water (liquid) and the acoustic velocity (m/s). In addition, FIG. 10A is a graph showing the change in a reference flow volume for each passage of time T in the case of a water temperature of 20° C., while FIG. 10B is a graph showing the output of the transducers relative to the reference flow volume of FIG. 10A. In addition, FIG. 11A is a graph showing the change in a reference flow volume for each passage of time T in the case of a water temperature of 29° C., while FIG. 11B is a graph showing the output of the transducers relative to the reference flow volume of FIG. 11A.

Furthermore, the units of flow volume Q and the reference flow volume shown in FIGS. 10A and 11A indicate flow volume per minute (mL/min), and the reference flow volume indicates the flow volume flowing through the measuring pipe of the ultrasonic flow meter obtained with a calibrated flow meter.

Conversion values of flow volume relative to the output of the transducers are obtained from the graphs shown in FIGS. 9 through 11B.

It is generally known that the acoustic velocity of ultrasonic waves output from the transducers changes considerably according to the temperature of the liquid, and can be represented in the graph showing the relationship between temperature and the acoustic velocity of FIG. 9. According to the graph shown in FIG. 9, the acoustic velocity can be seen to increase the higher the temperature of the liquid.

In consideration of this change in the acoustic velocity due to temperature, as shown in the graph of FIG. 10A, water at a temperature of 20° C. is allowed to flow in two stages of 1000 mL and 500 mL per minute from time 0 through the measuring pipe of the ultrasonic flow meter using the reference flow meter. For the flow volume of the former first stage, the water is allowed to flow for time interval T1, and for the flow volume of the latter second stage, water is allowed to flow for time interval T2 so as to be continued from the first stage.

Whereupon, as shown in FIG. 10B, although the output of ultrasonic waves outputted from the transducers at the ambient temperature of 24° C. remained nearly level prior to time 0 before the water flows (see A), it can be seen to decrease suddenly by displacement D1 (see B) corresponding to the start of water flow (time 0). When the flow volume of the water changes from 1000 mL/min to 500 mL/min (see C), the output can be seen to only change slightly by displacement D2.

As shown in the drawings, the difference in the output between displacement D1 and displacement D2 is such that D1□□D2, and the change in the output due to the temperature change of the difference of 4° C. between the ambient temperature and the water temperature can be understood to be larger than the change in the output during the change in flow volume.

Next, an explanation is provided of the graphs in the case of allowing water at a water temperature of 29° C. to flow as shown in FIG. 11 in comparison with the graph of FIG. 10. As shown in FIG. 11A, water at a temperature of 29° C. is allowed to flow in two stages at 1000 mL/min and 500 mL/min starting at time 0 through the measuring pipe of the ultrasonic flow meter using the reference flow meter. For the flow volume of the former first stage, the water is allowed to flow for time interval T3, and for the flow volume of the latter second stage, the water is allowed to flow for time interval T4 so as to be continued from the first stage.

Whereupon, as shown in the graph of FIG. 11B, although the output of ultrasonic waves output from the transducers at an ambient temperature of 24° C. was at the same position and remained nearly level (see E) at the stage of time 0 before the water flowed in the same manner as FIG. 10A, it can be seen increase suddenly by displacement D3 (see F) corresponding to the start of the flow of water (time 0). When the flow volume of water changes from 1000 mL/min to 500 mL/min (see G), the output can be seen to only change slightly by displacement D4.

As indicated in the drawings, the difference in output between displacement D3 and displacement D4 is such that D3□□D4, and the change in the output caused by a temperature change of the difference of 5° C. between the ambient temperature and water temperature can be seen to be larger than the change in the output for the change in flow volume.

In this manner, in the ultrasonic flow meter, changes in flow volume are captured in an output region that is much smaller than the change in the output of the transducers resulting from a change in the liquid temperature. It can also be understood that the greater the difference between ambient temperature and liquid temperature, the larger the change in the output of the transducers.

Thus, if the liquid temperature is influenced even minimally by the external ambient temperature, the output of the transducer changes considerably, and measurement of flow volume at an extremely small displacement for this output of the transducers has a high potential to invite measurement error.

In this manner, in the conventional ultrasonic flow meter, there were cases in which it was difficult to accurately measure flow volume depending on the ambient temperature.

SUMMARY OF THE INVENTION

In consideration of the above circumstances, the object of the present invention is to provide an ultrasonic flow meter that is able to minimize effects caused by external vibrations, and accurately measure flow volume without being affected by outside temperature.

In order to achieve the above object, the present invention provides an ultrasonic flow meter comprising: a measuring pipe through which a liquid flows, and two measuring units provided on the measuring pipe at an interval in its lengthwise direction and which measures flow volume by determining the flow rate of the liquid from the difference in propagation times of ultrasonic waves in both directions between these measuring units; wherein, the measuring pipe is supported on a support stand, on which a pair of mounting units are provided on a base at a wider interval than the measuring units, by retaining the measuring pipe in the mounting units provided at an interval to the outside of the measuring units in an axial direction of the measuring pipe.

In this manner, since the measuring pipe is retained and supported at the outside of the measuring units in the axial direction of measuring pipe by mounting units provided on the base, external vibrations can be blocked with the mounting units, thereby allowing the reliability of measurement between the measuring units, which are susceptible to the effects of external vibrations, to be enhanced.

In the ultrasonic flow meter of the present invention, it is preferable that the mounting units have a first mounting member and a second mounting member that are fixed to be mutually facing, and retaining indentations in the shape of a circular arc, which form an opening that holds the outer periphery of the measuring pipe when mutually facing, are formed in these first and second mounting members.

In this manner, by mutually facing the first and second mounting members in the state in which the measuring pipe is arranged in retaining indentations formed in the first and second mounting members, the outer periphery of the measuring pipe can be retained extremely easily.

In the ultrasonic flow meter of the present invention, it is preferable that the mounting members have a lower mounting member and an upper mounting member fixed to be mutually facing above and below, and retaining indentations in the shape of a circular arc, which form an opening that holds the outer periphery of the measuring pipe when mutually facing, are formed in these lower and upper mounting members.

In this manner, by mutually facing the upper and lower mounting members in the state in which the measuring pipe is arranged in the retaining indentations formed on the upper and lower mounting members, the outer periphery of the measuring pipe can be retained extremely easily.

In the ultrasonic flow meter of the present invention, it is preferable that the inner diameter of an diameter of an opening which is composed by the retaining indentations is slightly smaller than the outer diameter of the measuring pipe.

In this manner, since the opening comprised by the retaining indentations formed by mutually facing each mounting member is formed to have a diameter that is slightly smaller than the outer diameter of the measuring pipe, the measuring pipe can be reliably retained by both mounting members.

In the ultrasonic flow meter of the present invention, it is preferable that the retaining indentations are formed to have a rugged surface.

In this manner, since the retaining indentations are formed to have a rugged surface, the measuring pipe can be reliably retained, and the effects of external vibrations can be further reduced.

In the ultrasonic flow meter of the present invention, it is preferable that the surface of the retaining indentations has a rugged shape as a result of forming engaging grooves along the peripheral direction.

In this manner, since the surface of the retaining indentations is formed to have a rugged shape as a result of forming engaging grooves along the peripheral direction, vibrations in the measuring pipe in the axial direction can be reliably blocked by the engaging grooves.

In the ultrasonic flow meter of the present invention, it is preferable that the engaging grooves are V-shaped grooves.

In this manner, since the engaging grooves are V-shaped grooves, the outer peripheral surface of the measuring pipe reliably engages with the engaging grooves, thereby reliably retaining the measuring pipe in the mounting members.

In the ultrasonic flow meter of the present invention, it is further preferable that a plurality of the engaging grooves are formed in the retaining indentations at intervals in the axial direction of the measuring pipe that is retained.

In this manner, since a plurality of engaging grooves are provided arranged in the axial direction, vibrations transmitted to the measuring pipe can be blocked even more reliably.

In the ultrasonic flow meter of the present invention, it is preferable that an insulating means that covers the measuring units and suppresses the transfer of heat from the outside is provided.

In this manner, since the measuring units are covered by the insulating means, it is difficult for external heat to transfer to the measuring units, and the temperature of the measuring units is maintained. In other words, the temperature of the liquid flowing through the measuring pipe constitutes the main effect on the measuring units. Therefore, the temperature of the liquid flowing through the measuring units is no longer affected by the external ambient temperature, and flow volume can be measured accurately from changes in the acoustic velocity of ultrasonic waves in accordance with the liquid temperature.

In the ultrasonic flow meter of the present invention, it is further preferable that the insulating means is composed of an insulating material.

In this manner, since the insulating means is composed of the insulating material, heat insulation is carried out more effectively, and for example, the measuring units can be covered according to the shape of the measuring units to promote more effective heat insulation. Therefore, it is possible to accurately measure flow volume without the liquid temperature being affected by the external temperature.

In the ultrasonic flow meter of the present invention, it is further preferable that the insulating means is a case that houses the measuring units.

In this manner, the measuring units are removed from transfer of heat from the outside by being housed, and therefore, flow volume can be measured accurately by blocking the effects of the external ambient temperature. In addition, the measuring units can be protected by the case, and the reliability and durability of the ultrasonic flow meter are improved. The case preferably uses a material having insulating action and a low coefficient of heat transfer, and preferably uses a material such as SUS.

DESCRIPTION OF THE PREFERRED EMBODIMENTS

The following provides an explanation of the ultrasonic flow meter of the embodiments of the present invention with reference to the drawings.

[First Embodiment]

The following provides an explanation of a first embodiment of the ultrasonic flow meter as claimed in the present invention.

Figure 1:
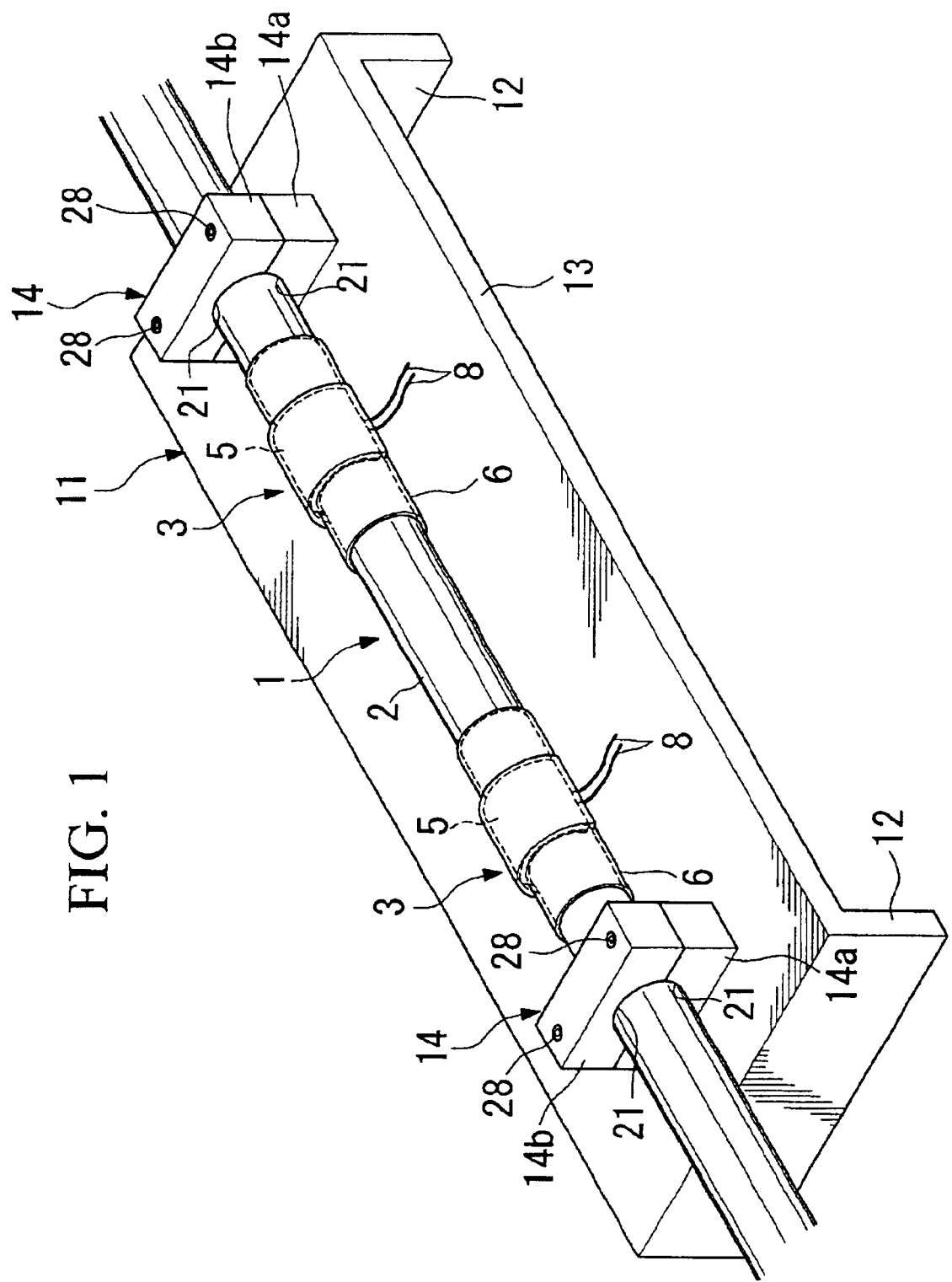
FIG. 1 is a perspective view for explaining the structure of the ultrasonic flow meter in a first embodiment of the present invention.
Figure 2:
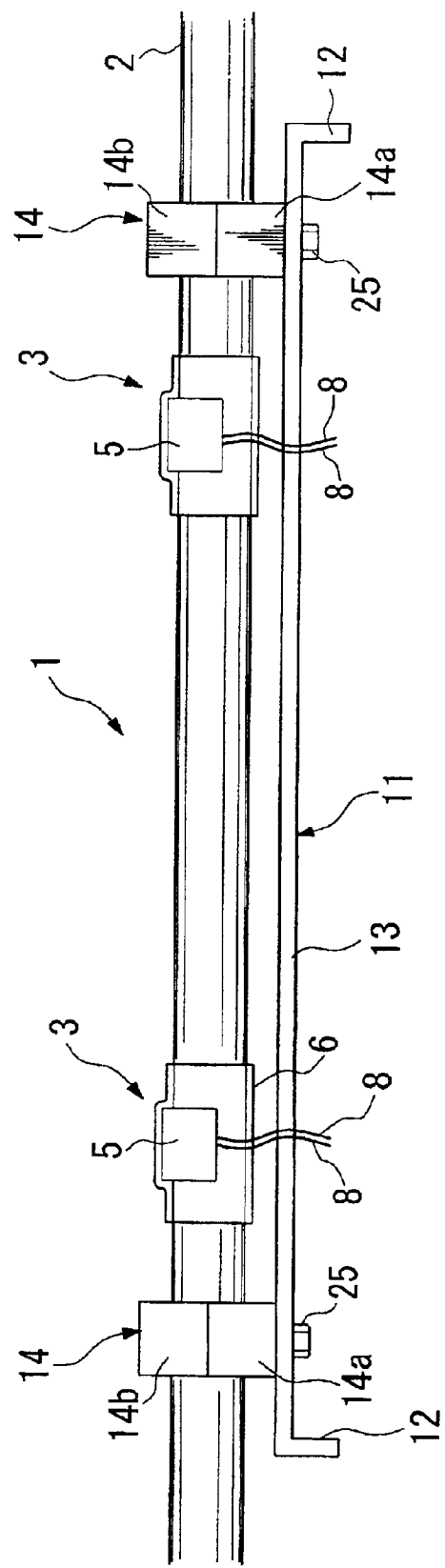
FIG. 2 is a side view for explaining the structure of the ultrasonic flow meter in the first embodiment of the present invention.

In FIGS. 1 and 2, reference symbol 1 indicates an ultrasonic flow meter. This ultrasonic flow meter 1 is formed from a synthetic resin having superior chemical resistance such as vinyl chloride or fluororesin, and has a measuring pipe 2 through which a liquid flows, and two measuring units 3 provided at an interval in the lengthwise direction on this measuring pipe 2.

The measuring units 3 employ a structure in which a transducer 5 is tightly adhered to the outer periphery of the measuring pipe 2, and its outer periphery is covered by the retaining tube 6. Furthermore, reference symbol 8 in the drawings indicates lead wires of transducer 5.

The ultrasonic flow meter 1 composed in the manner described above is supported on a support stand 11. This support stand 11 has a base 13 provided with legs 12 extending downward, and mounting units 14 provided on the upper surface of base 13 near both ends, and ultrasonic flow meter 1 is respectively supported by these mounting units 14 at locations farther to the outside of the measuring unit 3 in the an axial direction of the measuring pipe 2.

Figure 3:
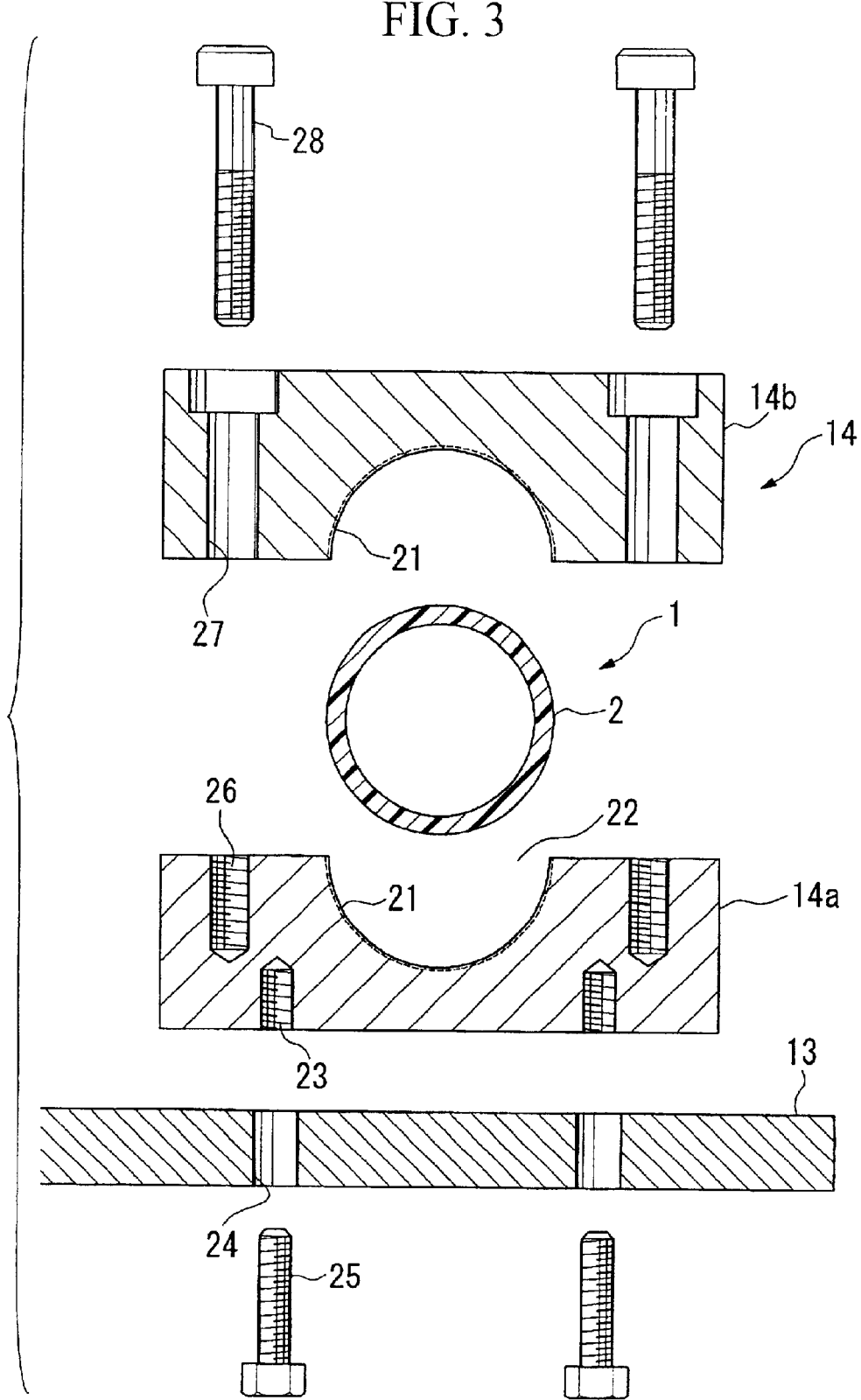
FIG. 3 is an exploded cross-sectional view for explaining the structure of the mounting unit that fixes the ultrasonic flow meter in the first embodiment of the present invention to the support stand.

As shown in FIG. 3, each mounting unit 14 has a lower mounting member 14a fixed on base 13, and an upper mounting member 14b fixed to the upper portion of this lower mounting member 14a.

Retaining indentations 21 in the shape of a circular are are formed on the respective opposing faces of the lower mounting member 14a and the upper mounting member 14b, and by mutually facing the lower mounting member 14a and the upper mounting member 14b, a opening 22 having circular shape is formed by each retaining indentation 21.

A pair of threaded holes 23 are formed in the lower surface of lower mounting member 14a, and by screwing bolts 25 that are inserted from the lower surface of the base 13 through mounting holes 24 formed in the base 13 into these threaded holes 23 the lower mounting member 14a is fastened to the base 13.

In addition, a pair of coupling threaded holes 26 are formed in the upper surface of the lower mounting member 14a, and insertion holes 27 are formed in the upper mounting member 14b that are continuous with the coupling threaded holes 26 when installed on the upper portion of the lower mounting member 14a.

By installing the upper mounting member 14b on the upper portion of the lower mounting member 14a, inserting mounting bolts 28 into the insertion holes 27 of upper mounting member 14b in the state in which the measuring pipe 2 of the ultrasonic flow meter 1 is arranged in the opening 22 comprised by the retaining indentations 21, and screwing the mounting bolts 28 into the coupling threaded holes 26, the lower mounting member 14a and the upper mounting member 14b are fastened together, and then the measuring pipe 2 of the ultrasonic flow meter 1 is held in the opening 22 comprised by the retaining indentations 21.

Here, the inner diameter of the opening 22 comprised by the retaining indentations 21 of the lower mounting member 14a and the upper mounting member 14b is made to be slightly smaller than the outer diameter of the measuring pipe 2.

Figure 4:
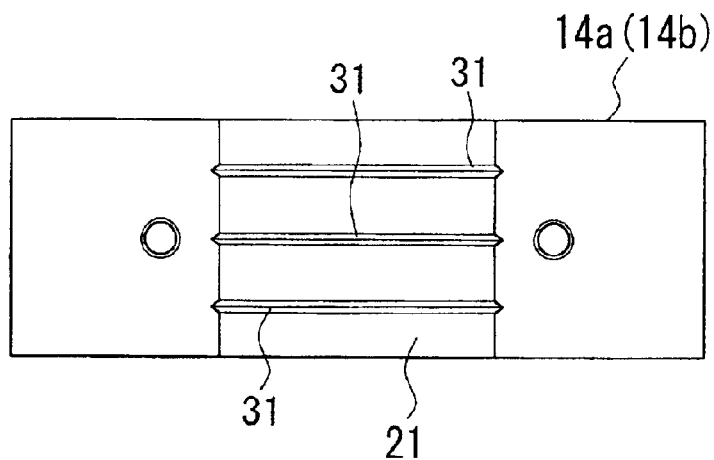
FIG. 4 is an overhead view for explaining the structure of the mounting member of the mounting unit of FIG. 3.
Figure 5:
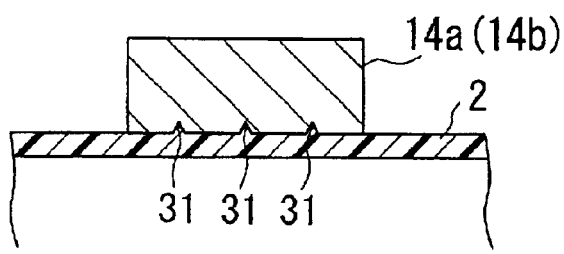
FIG. 5 is a partial cross-sectional view for explaining the structure of the fixing portion of the mounting unit of FIG. 3.

Moreover, as shown in FIGS. 4 and 5, a plurality of V-shaped engaging grooves 31 are formed along the peripheral direction at intervals in the axial direction in the retaining indentations 21 of the lower mounting member 14a and the upper mounting member 14b.

Figure 6:
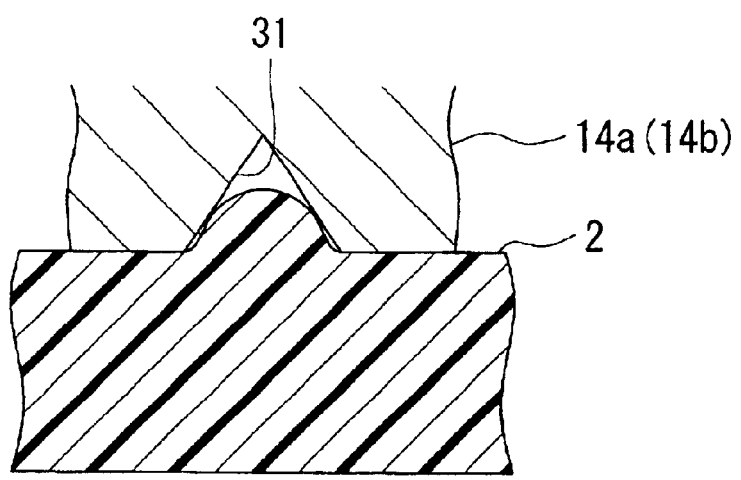
FIG. 6 is a partially enlarged cross-sectional view for explaining the structure of the fixing portion of the mounting unit of FIG. 3.

As a result, when the measuring pipe 2 of the ultrasonic flow meter 1 is fixed by these mounting units 14, as a result of the outer periphery of the measuring pipe 2 engaging with the engaging grooves 31 of the retaining indentations 21 of the lower mounting member 14a and the upper mounting member 14b as shown in FIG. 6, the measuring pipe 2 is reliably held, and displacement of the measuring pipe 2 in the axial direction of the measuring pipe 2 or in any of the other four directions is reliably prevented.

In this manner, according to the above-mentioned ultrasonic flow meter, since the measuring pipe 2 is held and supported by the mounting units 14 provided on the base 13 at locations farther to the outside in the axial direction than measuring units 3 provided at an interval, external vibrations can be blocked with the mounting members 14. Therefore, it is possible to enhance the reliability of measurement between the measuring units 3, which are susceptible to the effects of external vibrations.

Moreover, by facing the lower mounting member 14a and the upper mounting member 14b in the state in which the measuring pipe 2 is arranged in the retaining indentations 21 formed in the lower mounting member 14a and the upper mounting member 14b, the outer periphery of the measuring pipe 2 can be held extremely easily.

In addition, since the opening 22 comprised by the retaining indentations 21 formed by the facing lower mounting member 14a and the upper mounting member 14b is formed to have a slightly smaller diameter than the outer diameter of the measuring pipe 2, the measuring pipe 2 can be reliably held by the lower mounting member 14a and the upper mounting member 14b.

Moreover, since the surface of the retaining indentations 21 is formed in a rugged shape by a plurality of engaging grooves 31 arranged in the axial direction along their peripheral direction, vibrations to the axial direction in the measuring pipe 2 can be reliably blocked by the engaging grooves 31.

Moreover, since the engaging grooves 31 are in the form of V-shaped grooves, the outer peripheral surface of the measuring pipe 2 can reliably engage with engaging grooves 31, thereby allowing measuring pipe 2 to be even more reliably held in mounting units 14.

[Second Embodiment]

Figure 7A:
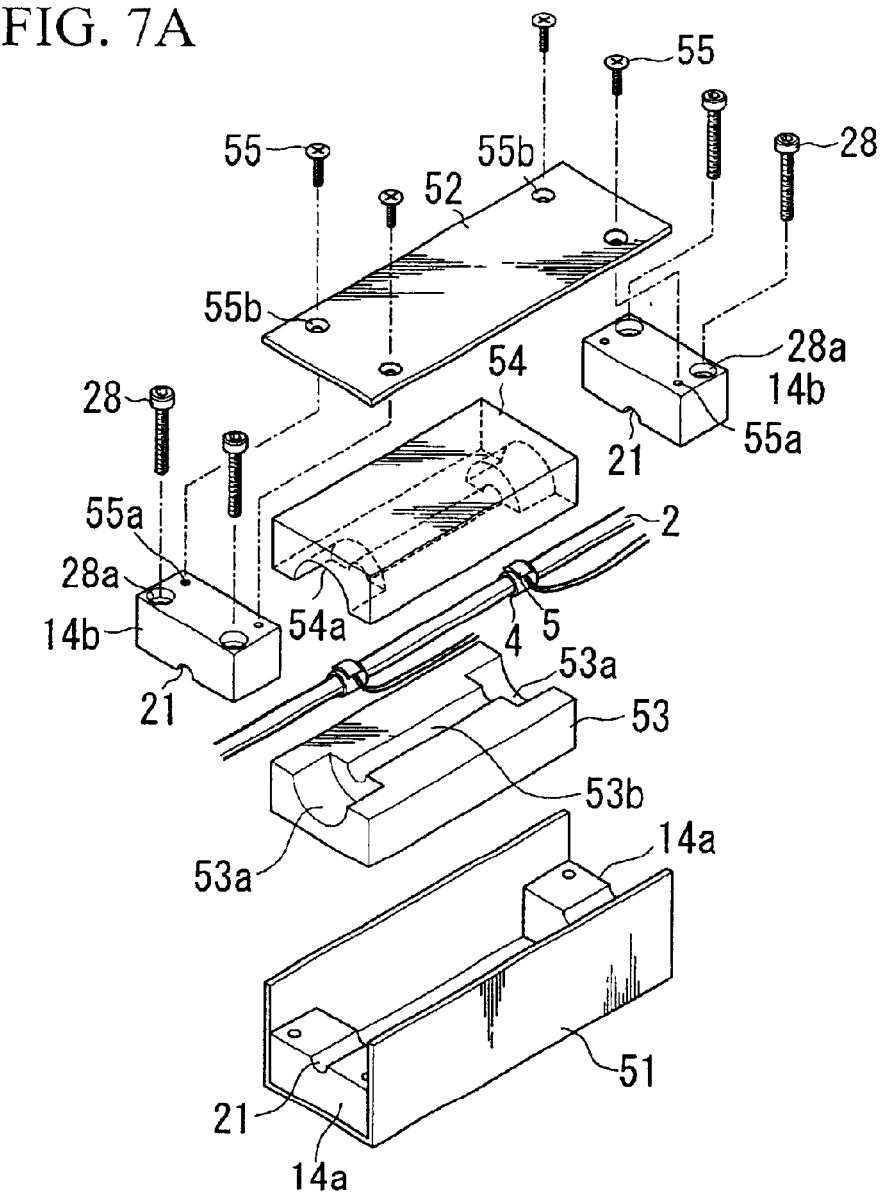
FIG. 7A is an exploded view for explaining the structure of the ultrasonic flow meter in a second embodiment of the present invention
Figure 7B:
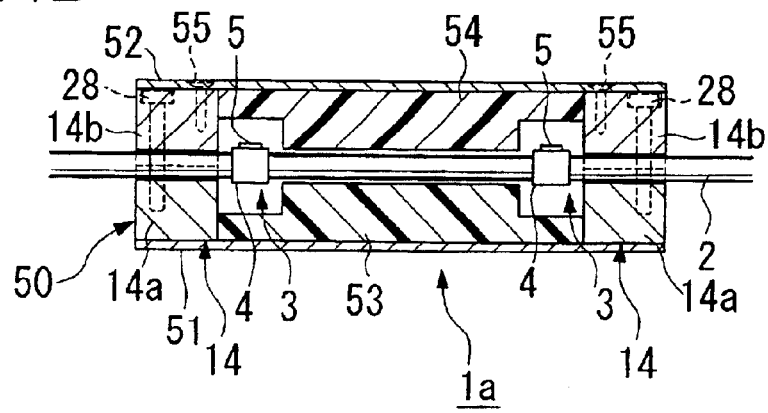
FIG. 7B is a cross-sectional view of the ultrasonic flow meter of FIG. 7A as viewed from the cross-section taking along the axis of a measuring pipe.

The following provides an explanation of a second embodiment of the ultrasonic flow meter as claimed in the present invention using FIGS. 7A and 7B.

FIGS. 7A and 7B are drawings showing an ultrasonic flow meter 1a in the present embodiment, with FIG. 7A being an exploded view of the ultrasonic flow meter 1a, and FIG. 7B being a cross-sectional view as viewed from the cross-sectional parallel to the axis of a measuring pipe 2 of the ultrasonic flow meter 1a.

In the drawing, reference symbol 4 indicates a tightly adhered tube, 14 indicates a mounting unit composed of a lower mounting member 14a and an upper mounting member 14b, 50 indicates a case (insulating means) composed of a lower case 51 serving as a base and an upper case 52, and 53 and 54 indicate respective insulating materials (insulating means).

Furthermore, since other reference symbols are the same as in the ultrasonic flow meter explained in the above first embodiment, their explanation is omitted.

The case 50 shown in FIG. 7B is composed by the combining lower case 51, formed into the shape of a "U" by bending, and the upper case 52, formed into the shape of a flat plate to match the opening in the top of the lower case 51. This case 50 is made of SUS (Stainless Steel) material having a comparatively poor heat transfer rate, and its total length has a length that is equal to or greater than the interval between the measuring units 3 provided at a prescribed interval.

The lower mounting members 14a, which are formed at roughly half the height of the case 50, are fixed at both ends in the lengthwise direction of the lowercase 51 so as to each be housed within the lower case 51 in the same manner as the attachment to the base 13 shown in the first embodiment. The retaining indentations 21 in the shape of a circular are are formed in the upper surface of the lower mounting members 14a, and by mutually facing the opposing retaining indentations 21 of the upper mounting member 14a, openings are formed by the respective retaining indentations 21.

A pair of bolt insertion holes 27 for the mounting bolts 28 that fasten the upper mounting members 14b and the lower mounting members 14a are formed in the upper surface of the upper mounting member 14a in the same manner as the first embodiment, and a pair of bolt insertion holes 55a for upper cover mounting bolts 55 for attaching the upper cover 52 are also formed in the upper surface of the upper mounting member 14a. Furthermore, a pair of insertion holes 55b to pass the upper cover mounting bolts 55 are each formed in the upper cover 52 as well.

The insulating materials 53 and 54, divided into two parts above and below each other, use foaming polystyrol for their material, and are formed to a size such that they can be housed in the space inside the case 50 when combined. Indentation 53b in the shape of a circular arc is formed in the upper surface of lower insulating material 53 to match the shape of measuring pipe 2, while indentations 53a in the shape of a circular are having a large radius are formed in the upper surface of lower insulating material 53 to match the positions of both measuring units 3.

In addition, indentations are formed in upper insulating member 54 as well to match the shapes of the measuring pipe 2 and the measuring units 3 in the same manner as lower insulating member 53.

In the measuring unit 3, differs from the measuring unit 3 shown in the first embodiment, the transducer 5 is fixed to the outside of the measuring pipe 2 over the tightly adhered tube 4. In this case, ultrasonic waves emitted or received from the transducer 5 are transmitted through the tightly adhered tube 4 fixed by being tightly adhered to the outside of the measuring pipe 2. The tightly adhered tube 4 is fixed by, for example, a gel-like adhesive.

The ultrasonic flow meter 1a assembled as shown in FIG. 7B is formed to have an external shape such that both the measuring units 3 of the measuring pipe 2 are covered by the case 50, and is further composed so that both the measuring units 3 and the measuring pipe 2 between them housed inside the case 50 are covered by the insulating materials 53 and 54.

As a result, the inside and outside of the ultrasonic flow meter 1a are isolated by the case 50 making them thermally insulated, and the space between the measuring units 3 is further isolated from the outside by insulating material, thereby making them thermally insulated.

According to the ultrasonic flow meter 1a in the present embodiment explained above, since the measuring pipe 2 is held and supported by the mounting units 14 provided inside the case 50 father to the outside in the axial direction than the measuring units 3 provided at an interval, vibrations from the outside can be blocked by the mounting units 14 and as a result, the reliability of measurement between the measuring units 3, which are susceptible to the effects of external vibrations, can be enhanced.

In addition, since liquid flowing inside the measuring pipe 2 is no longer affected by external ambient temperature due to the case 50 and the insulating materials 53 and 54, the temperature of the liquid no longer changes in both measuring units 3, thereby making it possible to accurately measure flow volume corresponding to the temperature of the liquid.

Furthermore, although a constitution in which the insulating materials 53 and 54 are provided inside the case 50 has been explained for the ultrasonic flow meter 1*a* explained in the present embodiment, this should not be interpreted as being limited to this, but rather only the case 50 may be provided as an insulating means of measuring pipe 2. According to this, although insulating effects decrease as compared with the present embodiment, if installed in a location where there is little change in ambient temperature, this ultrasonic flow meter is still capable of fulfilling its function. Furthermore, since the insulating materials 53 and 54 are not used, production costs can be reduced.

Figure 8A:
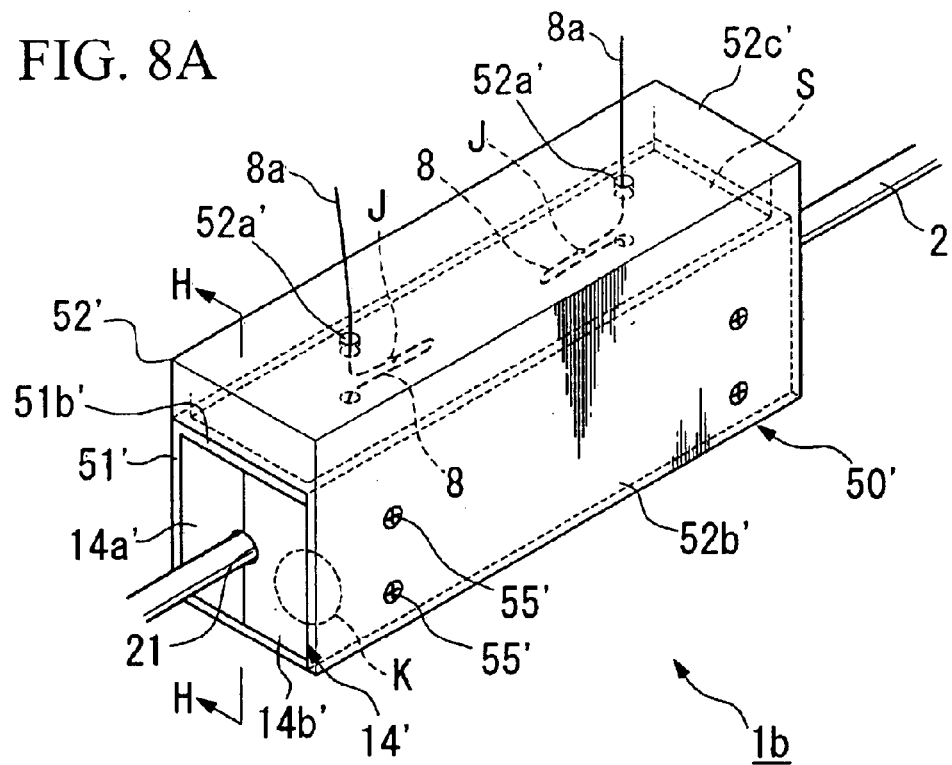
FIG. 8A is a perspective view for explaining the structure of the ultrasonic flow meter showing a variation of the second embodiment.
Figure 8B:
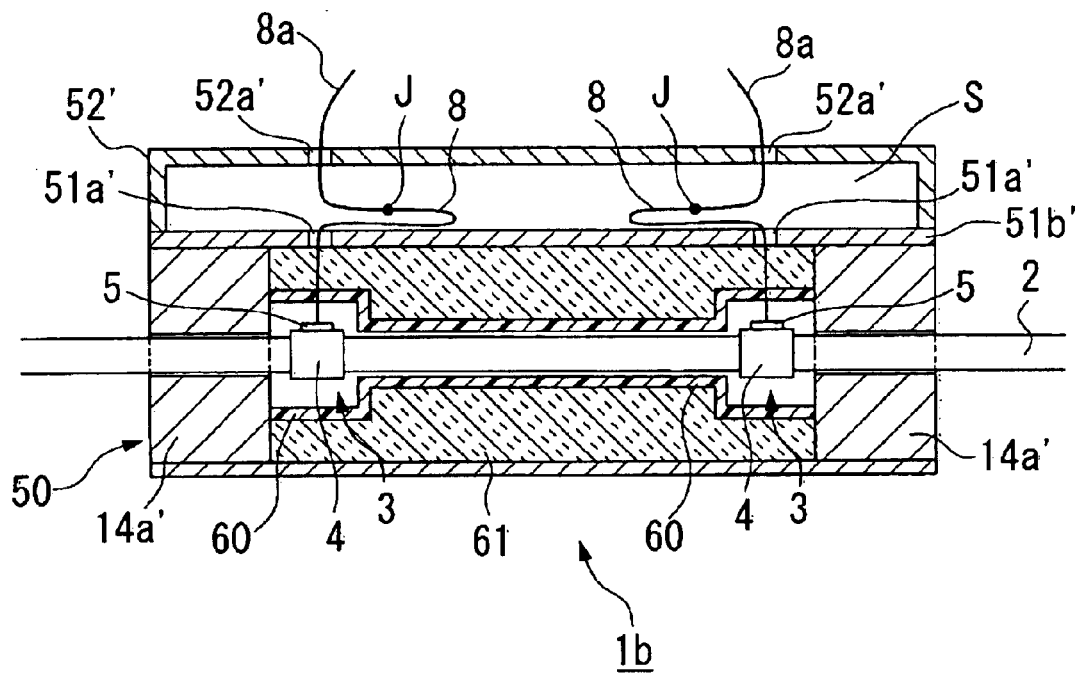
FIG. 8B is a cross-sectional view of the ultrasonic flow meter of FIG. 8A as viewed from cross-section H—H taken along the axis of the measuring pipe.
Figure 9:
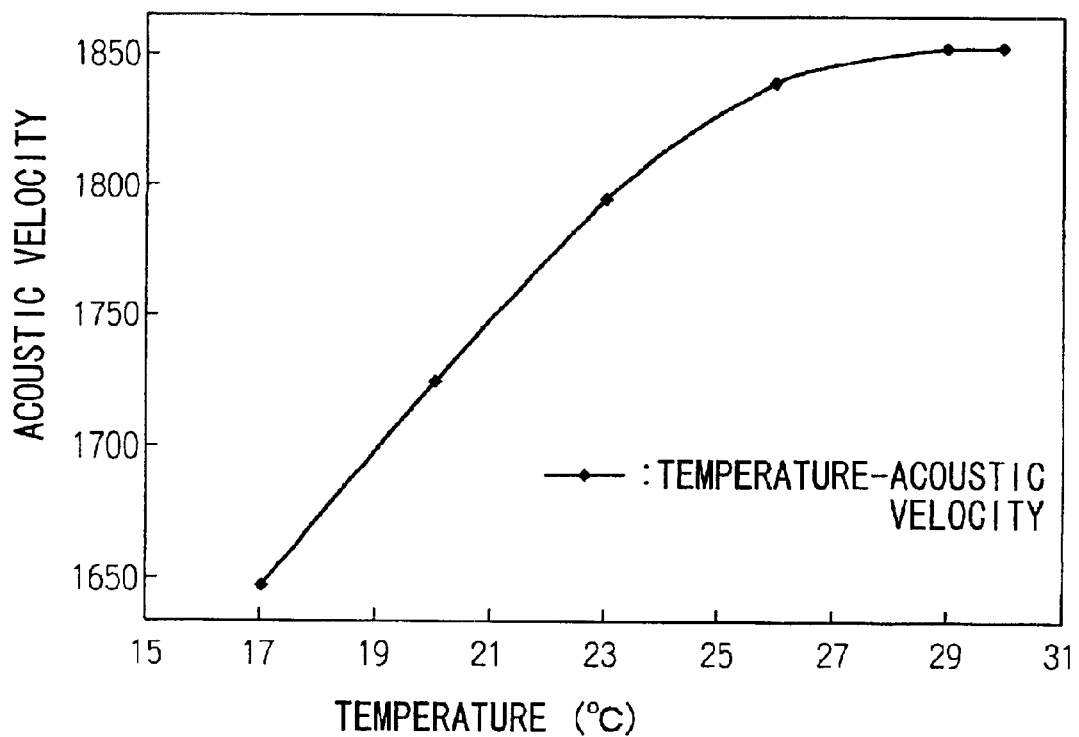
FIG. 9 is a graph showing the relationship between water temperature and acoustic velocity.
Figure 10A:
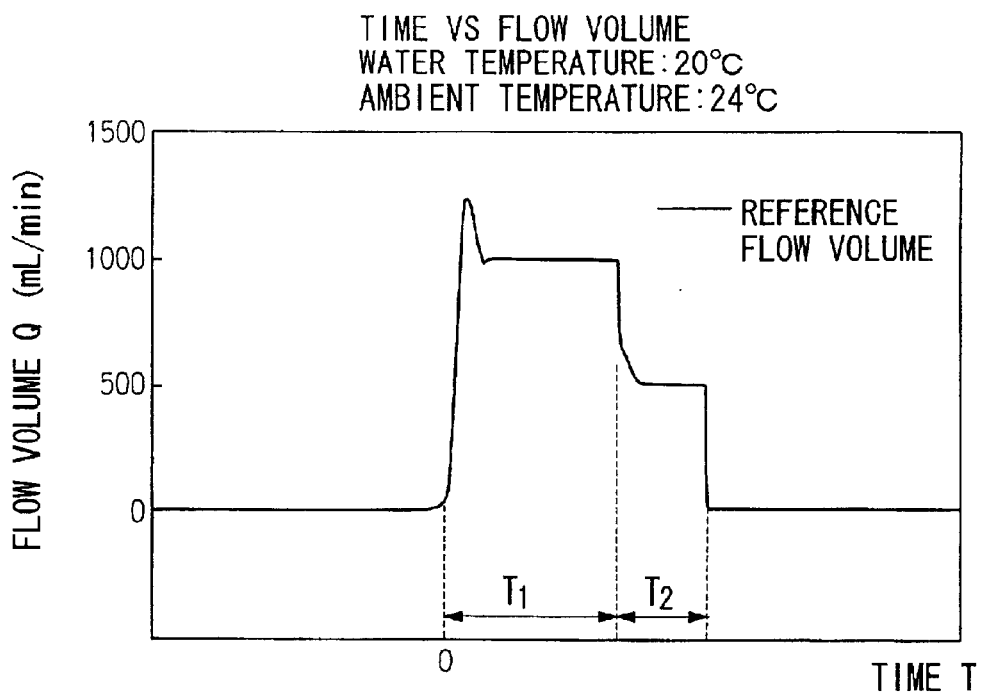
FIG. 10A is a graph of experimental data showing the change in reference flow volume during time T at a water temperature of 20° C.
Figure 10B:
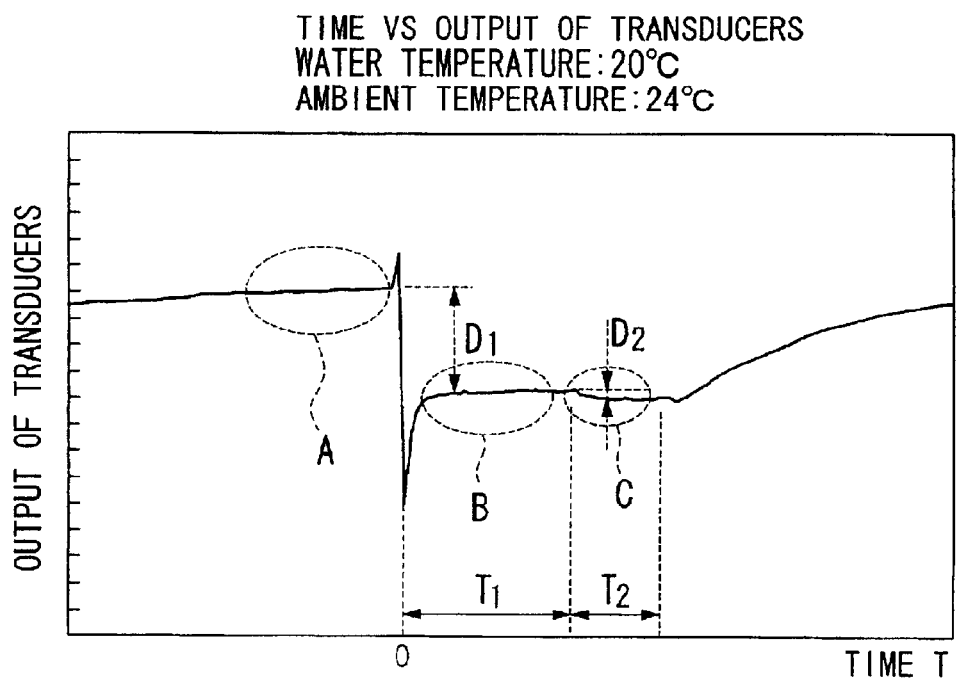
FIG. 10B is a graph of experimental data showing the change in the output of the transducer relative to the reference flow volume shown in FIG. 10A.
Figure 11A:
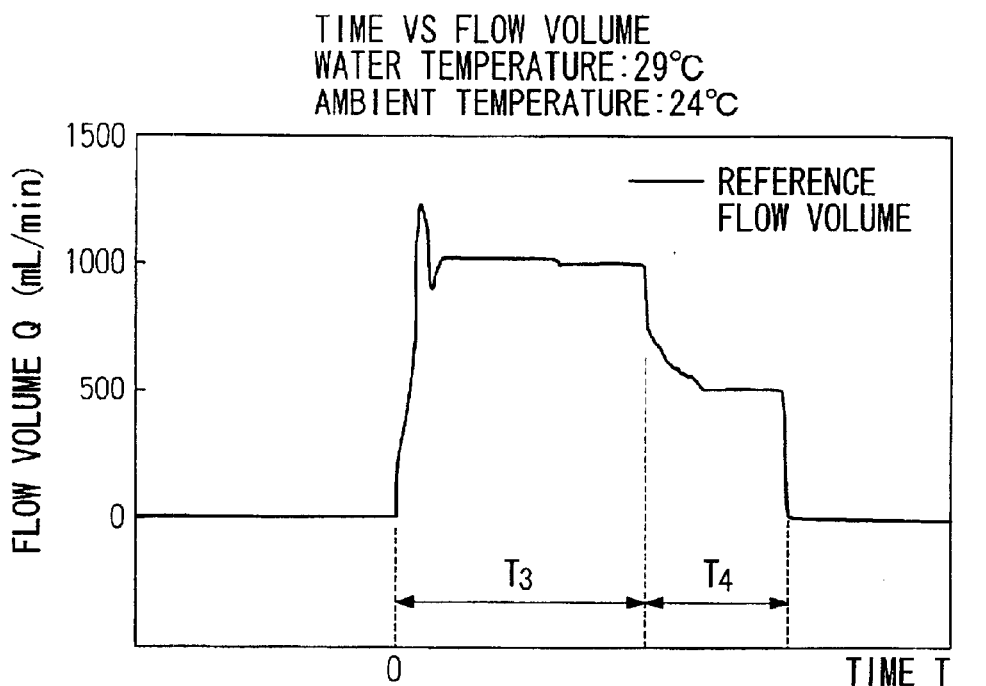
FIG. 11A is a graph of experimental data showing the change in reference flow volume during time T at a water temperature of 29° C.
Figure 11B:
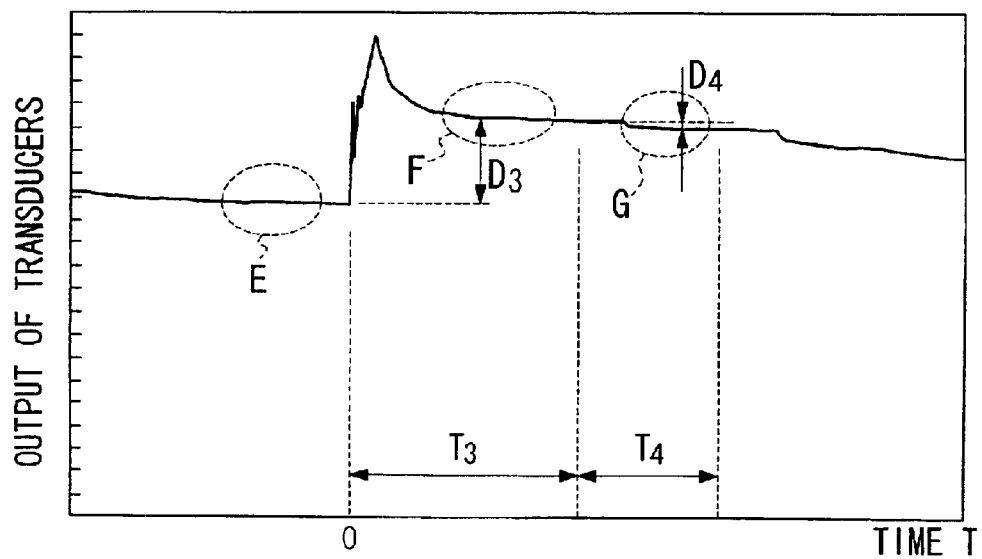
FIG. 11B is a graph of experimental data showing the change in the output of the transducer relative to the reference flow volume shown in FIG. 11A.

In addition, an ultrasonic flow meter 1*b* shown in FIGS. 8A and 8B may be used as a variation of the present embodiment. FIGS. 8A and 8B are drawings explaining the structure of the ultrasonic flow meter 1*b* showing a variation of the present embodiment, with FIG. 8A being a perspective view showing its external form, and FIG. 8B being a cross-sectional view taking along the axial direction the of measuring pipe 2 in cross-section H—H of FIG. 8A.

Reference symbol 51' indicates a lower case in the shape of the letter "U" similar to the first embodiment, 52' indicates an upper cover in the shape of the letter "L", 60 indicates a protective cover installed so as to cover the measuring units 3 and the outer periphery of the measuring pipe 2 between the both measuring units 3, and 61 indicates an insulating material (insulating means) filled inside lower case 51'. In addition, reference symbol S indicates a space for processing wiring connections formed by the upper cover 52', while reference symbols J indicate wiring connections between lead wires 8 and cables 8*a*.

The lower case 51' has a opening (see reference symbol K) formed on the right side so as to cover the axis of the measuring pipe 2 in the drawings, and a wall 52*b*' that composes the upper cover 52' is attached to as to cover this opening.

In addition, the mounting units 14' are provided on both ends of the lower case 51' similar to the ultrasonic flow meter 1*a* explained in FIGS. 7A and 7B. As shown in FIG. 8A, the mounting units 14' are divided into two sections to match the direction of orientation of the opening of the lower case 51', with a right mounting member 14*b*' (second mounting member) being provided on the side of the opening of the lower case 51', and a left mounting member 14*a*' (first mounting member) being provided at the position that faces the right mounting member 14*b* ' with measuring pipe 2 interposed between. In other words, the ultrasonic flow meter 1*b* referred to here is arranged nearly equivalent to the state in which the ultrasonic flow meter 1*a* shown in FIG. 7 is rotated by 90 degrees about the axis of the measuring pipe 2 as the center, and the measuring pipe 2 is fixed by the mounting units 14'.

In addition, lead wire guide holes 51*a*' are formed in an upper wall 51*b*' that composes lower case 51', respectively arranged nearly directly above the measuring units 3 on both sides. As a result, the lead wires 8 of the transducer 5 are wired outside of the lower case 51' through the lead wire guide holes 51*a*', and the ends of the lead wires 8 are positioned in the space S formed by the upper cover 52' for processing the wiring connections.

The upper cover 52' has an L-shaped cross-section that intersects the axis of the measuring pipe 2, with one section being composed by a wall 52*b*' in the shape of a flat plate, and the other section being composed by a wall 52*c*' that is perpendicular to the wall 52*b*' and in the shape of a vat. A case 50' is then assembled by the plate-shaped wall 52*b*' being fixed to the right mounting member 14*b* ' of the lower case 51' by a plurality of upper cover fastening bolts 55'.

Cable guide holes 52*a*' are formed in the vat-shaped wall 52*c*' so as to oppose the lead wire guide holes 51*a*' formed in the lowercase 51'. In addition, the space S for processing wiring connections is formed inside the vat-shaped wall 52*c*' as a result of combining the lower case 51'.

The space S is an empty space that houses wiring connections J that are formed by processing the wiring connections of the lead wires 8.

The lead wires 8 have a prescribed length from the transducer 5, and are required to be extended in processes of composing the ultrasonic flow meter 1*b*. Consequently, the lead wires 8 are connected with cables 8*a* capable of reliably incorporating weak signals to a measuring amplifier and so forth with the wiring connections J, and are wired outside of the case 50' from the cable guide holes 52*a*' after being fixed in the vicinity of the lead wire 18, guide holes 51*a'*.

Thus, the wiring connections J of the lead wires 8 are located within the space S for processing wiring connections. Naturally, the upper cover 52' is attached to the lower case 51' after having filled the insulating material 61 to be described later, and at the time of completion of connection processing of the lead wires 8 and the cables 8*a*.

In addition, the present variation also employs a structure in which the insulating material 61 is provided within the case 50'. In this variation, a structure is shown in which the insulating material 61 is filled after fixing the measuring pipe 2 with the mounting units 14' in the lower case 51', and partly covering the measuring units 3 and the measuring pipe 2 with protective cover 60 made of plastic and so forth.

The following provides a more detailed explanation of the constitution of the insulating material 61 and the filling work. Since the measuring units 3 and the measuring pipe 2 are important components for measuring flow volume, it is necessary that they be protected from the filling work of the insulating material 61 described later. In order to protect these components, the measuring units 3 and the measuring pipe 2 are covered by a protective cover 60 made of, for example, polypropylene resin. A similar resin may be used to cover the area around the lead wires 8 and the gaps of the case 50'.

After providing the protective cover 60 on the measuring units 3, the insulating material 61 in the form of foaming polystyrol and so forth is filled into the lower case 51'. As a result, the insulating material 61 is filled throughout all portions of the lower case 51', and thermal insulating action is obtained for the measuring units 3 and the measuring pipe 2 between the both measuring units 3.

Furthermore, the insulating material 61 may be partly filled into one side of the case 50' formed to match the shape of the protective cover 60 in advance, and then the protective cover 60 provided with the remaining insulating material 61 may be inserted inside the case 50'.

According to such an ultrasonic flow meter 1*b*, in addition to improving the rigidity of the case 50' and enhancing its strength, the thermal insulation properties can also be further improved. In addition, since the insulating material 61 can be easily provided within the case 50', it is not necessary to form insulating material to match the shapes of the measuring units 3 and the measuring pipe 2, thereby making it possible to suppress production costs. In addition, the wiring connections J of the lead wires 8 are located between the outside of the insulating material 61 and the inside of upper cover 52', thereby making it possible to realize simplification of connection processing and protection of the wiring connections J.

What is claimed is:

1. An ultrasonic flow meter comprising:

a measuring pipe through which a liquid flows; and two measuring units provided on said measuring pipe at an interval in its lengthwise direction, and which measures flow volume by determining the flow rate of a liquid from the difference in propagation times of ultrasonic waves in both directions between these measuring units; wherein, said measuring pipe is supported on a support stand, on which a pair of mounting units are provided on a base at a wider interval than said measuring units, by retaining said measuring pipe in said mounting units at the outside of said measuring units in an axial direction of said measuring pipe.

2. An ultrasonic flow meter according to claim 1, wherein said mounting units have a first mounting member and a second mounting member that are fixed to be mutually facing, and retaining indentations in the shape of a circular arc, which form an opening that holds the outer periphery of said measuring pipe when mutually facing, are formed in these first and second mounting members.

3. An ultrasonic flow meter according to claim 2, wherein the inner diameter of said opening formed from said retaining indentations is slightly smaller than the outer diameter of said measuring pipe.

4. An ultrasonic flow meter according to claim 3, wherein said retaining indentations are formed to have a rugged surface, in order to reduce external vibrations.

5. An ultrasonic flow meter according to claim 4, wherein the surface of said retaining indentations has a rugged shape as a result of forming engaging grooves along the peripheral direction.

6. An ultrasonic flow meter according to claim 5, wherein said engaging grooves are V-shaped grooves.

7. An ultrasonic flow meter according to claim 6, wherein a plurality of said engaging grooves are formed in said retaining indentations at intervals in the axial direction of the measuring pipe that is retained.

8. An ultrasonic flow meter according to claim 5, wherein a plurality of said engaging grooves are formed in said retaining indentations at intervals in the axial direction of the measuring pipe that is retained.

9. An ultrasonic flow meter according to claim 2, wherein said retaining indentations are formed to have a rugged surface, in order to reduce external vibrations.

10. An ultrasonic flow meter according to claim 9, wherein the surface of said retaining indentations has a rugged shape as a result of forming engaging grooves along the peripheral direction.

11. An ultrasonic flow meter according to claim 10, wherein said engaging grooves are V-shaped grooves.

12. An ultrasonic flow meter according to claim 11, wherein a plurality of said engaging grooves are formed in said retaining indentations at intervals in the axial direction of the measuring pipe that is retained.

13. An ultrasonic flow meter according to claim 10, wherein a plurality of said engaging grooves are formed in said retaining indentations at intervals in the axial direction of the measuring pipe that is retained.

14. An ultrasonic flow meter according to claim 1, wherein said mounting units have a lower mounting member and an upper mounting member fixed to be mutually facing above and below, and retaining indentations in the shape of a circular arc, which form an opening that holds the outer periphery of said measuring pipe when mutually facing, are formed in these lower and upper mounting members.

15. An ultrasonic flow meter according to claim 14, wherein the inner diameter of said opening formed from said retaining indentations is slightly smaller than the outer diameter of said measuring pipe.

16. An ultrasonic flow meter according to claim 14, wherein said retaining indentations are formed to have a rugged surface, in order to reduce external vibrations.

17. An ultrasonic flow meter according to claim 16, wherein the surface of said retaining indentations has a rugged shape as a result of forming engaging grooves along the peripheral direction.

18. An ultrasonic flow meter according to claim 17, wherein said engaging grooves are V-shaped grooves.

19. An ultrasonic flow meter according to claim 18, wherein a plurality of said engaging grooves are formed in said retaining indentations at intervals in the axial direction of the measuring pipe that is retained.

20. An ultrasonic flow meter according to claim 17, wherein a plurality of said engaging grooves are formed in said retaining indentations at intervals in the axial direction of the measuring pipe that is retained.

21. An ultrasonic flow meter according to any one of claims 1 to 7, wherein an insulating means that suppresses the transfer of heat from the outside is provided covering said measuring units.

22. An ultrasonic flow meter according to claim 21, wherein said insulating means is composed of an insulating material.

23. An ultrasonic flow meter according to claim 22, wherein said insulating means is a case that houses said measuring units and functions as said support stand.

* * * * *